United States Patent [19]
Haun et al.

[11] Patent Number: 5,162,664
[45] Date of Patent: Nov. 10, 1992

[54] COMMUNICATIONS ARRANGEMENT FOR AN ELECTRONIC CIRCUIT BREAKER TRIP SYSTEM

[75] Inventors: Andy A. Haun; Earl J. Tessmer, both of Cedar Rapids; Leon W. Durivage, III, Marion, all of Iowa

[73] Assignee: Square D Company, Palatine, Ill.

[21] Appl. No.: 585,449

[22] Filed: Sep. 20, 1990

Related U.S. Application Data

[63] Continuation-in-part of Ser. No. 403,244, Aug. 31, 1989, Pat. No. 5,089,928.

[51] Int. Cl.$^5$ .............................................. H02J 9/00
[52] U.S. Cl. ...................................... 307/64; 307/66; 361/94
[58] Field of Search ................ 307/64, 66; 361/93–97; 340/662, 664; 364/481, 483, 492

[56] References Cited

U.S. PATENT DOCUMENTS

| | | | |
|---|---|---|---|
| 4,335,413 | 6/1982 | Engel et al. | 361/93 |
| 4,338,647 | 7/1982 | Wilson et al. | 361/68 |
| 4,342,922 | 8/1982 | DiMassimo et al. | 307/66 |
| 4,521,678 | 6/1985 | Winter | 361/92 |
| 4,528,611 | 7/1985 | Udren | 361/81 |
| 4,535,409 | 8/1985 | Jindrick et al. | 307/132 E |
| 4,685,023 | 8/1987 | Heaston | 361/92 |
| 4,691,384 | 9/1987 | Jobe | 361/100 |
| 4,751,606 | 6/1988 | Matsko et al. | 361/93 |

Primary Examiner—A. D. Pellinen
Assistant Examiner—Fritz M. Fleming
Attorney, Agent, or Firm—Kareem M. Irfan; Robert J. Crawford

[57] ABSTRACT

A circuit arrangement is used to interface a fault-powered circuit breaker trip unit to a communication network. The circuit arrangement includes a diode protected line which draws power from the trip unit, a battery acting as a backup power source and a control circuit, responsive to the trip unit, which detects a trip unit alarm condition, receives data from a circuit breaker trip unit and processes the data for subsequent use. In response to the control circuit detecting the trip unit alarm condition, a switch circuit enables the backup power source such that power is provided to the control circuit after the trip unit alarm condition is received so that the control circuit can process the received data after the power provided by the trip unit expires.

20 Claims, 1 Drawing Sheet

COMMUNICATIONS ARRANGEMENT FOR AN ELECTRONIC CIRCUIT BREAKER TRIP SYSTEM

CROSS REFERENCE

This patent application is a continuation-in-part of U.S. patent application Ser. No. 07/403,244, entitled, "Fault Powered, Processor Controlled Circuit Breaker Trip System Having Reliable, Status Display," filed on Aug. 31, 1989 now U.S. Pat. No. 5,089,928, which is incorporated herein by reference.

BACKGROUND OF THE INVENTION

This invention relates generally to electronic circuit breakers, and more particularly, to communication circuits for electronic circuit breakers.

FIELD OF THE INVENTION

Trip systems are designed to respond to power faults detected in circuit breakers installed in power lines. Many conventional trip systems employ an electromagnet to trip the circuit in response to short circuit or overload faults. The electromagnet provides a magnetic field in response to the current flowing through the breaker. When the current level increases beyond a predetermined threshold, the magnetic field "trips" a mechanism which causes a set of circuit breaker contacts to release, thereby "breaking" the circuit path in the power lines.

Trip systems often employ computers for monitoring and displaying the status of the line current. A growing number of such trip systems are "fault-powered," meaning that the trip system circuitry draws power from the line current. When the trip system detects a fault in the line, it has a limited time to perform its functions because the imminent opening of the circuit breaker removes the power to the trip system.

There has been an increasing demand for such intelligent fault-powered trip systems, at least in part, due to the complexity of the equipment that is being protected by the trip systems Many of these applications require a single technician to monitor and service equipment in various locations throughout one or more facilities. Unfortunately, with known trip systems the technician must travel to each trip system location to gather whatever trip information was recorded before power was removed.

Accordingly, there is need for a fault-powered trip system which can overcome the aforementioned problems concerning removal of trip system power and the labor required by a servicing technician.

SUMMARY AND OBJECTS OF THE INVENTION

It is an object of the present invention to provide a power efficient and cost-effective communication arrangement for a fault-powered circuit breaker trip unit which overcomes the above problems associated with the prior art.

It is another object of the invention to provide such a circuit arrangement which can easily be field installed to a trip system using a minimal number of connectors.

According to a preferred embodiment, the present invention includes a circuit arrangement for processing data sent from a fault-powered circuit breaker trip unit. The circuit arrangement includes a circuit which draws power from the trip unit, a battery acting as a backup power source and a control circuit, responsive to the trip unit, which detects a trip unit alarm condition, receives data from a circuit breaker trip unit and processes the data for subsequent use. In response to the control circuit detecting the trip unit alarm condition, a switch circuit enables the backup power source such that power is provided to the control circuit after the trip unit alarm condition is received so that the control circuit can process the received data after the power provided by the trip unit expires.

In one embodiment, the control circuit includes a microcomputer which processes the data by first storing the data and then transmitting information representative of the data over a communication network to an external station. Because the switch circuit enables the backup power source, the microcomputer has a relatively long period of time to perform this task.

BRIEF DESCRIPTION OF THE DRAWING

Other objects and advantages of the invention will become apparent upon reading the following detailed description and upon reference to the FIGURE which is a schematic diagram of a preferred embodiment of the circuit arrangement for receiving data from a circuit breaker trip unit.

While the invention is susceptible to various modifications and alternative forms, a number of specific embodiments which may vary from the exemplary FIGURE will herein be described in detail. It should be understood, however, that it is not intended to limit the invention to any particular forms disclosed. On the contrary, the intention is to cover all modifications, equivalents, and alternatives falling within the spirit and scope of the invention as defined by the appended claims.

DESCRIPTION OF THE PREFERRED EMBODIMENT

Figure 1:
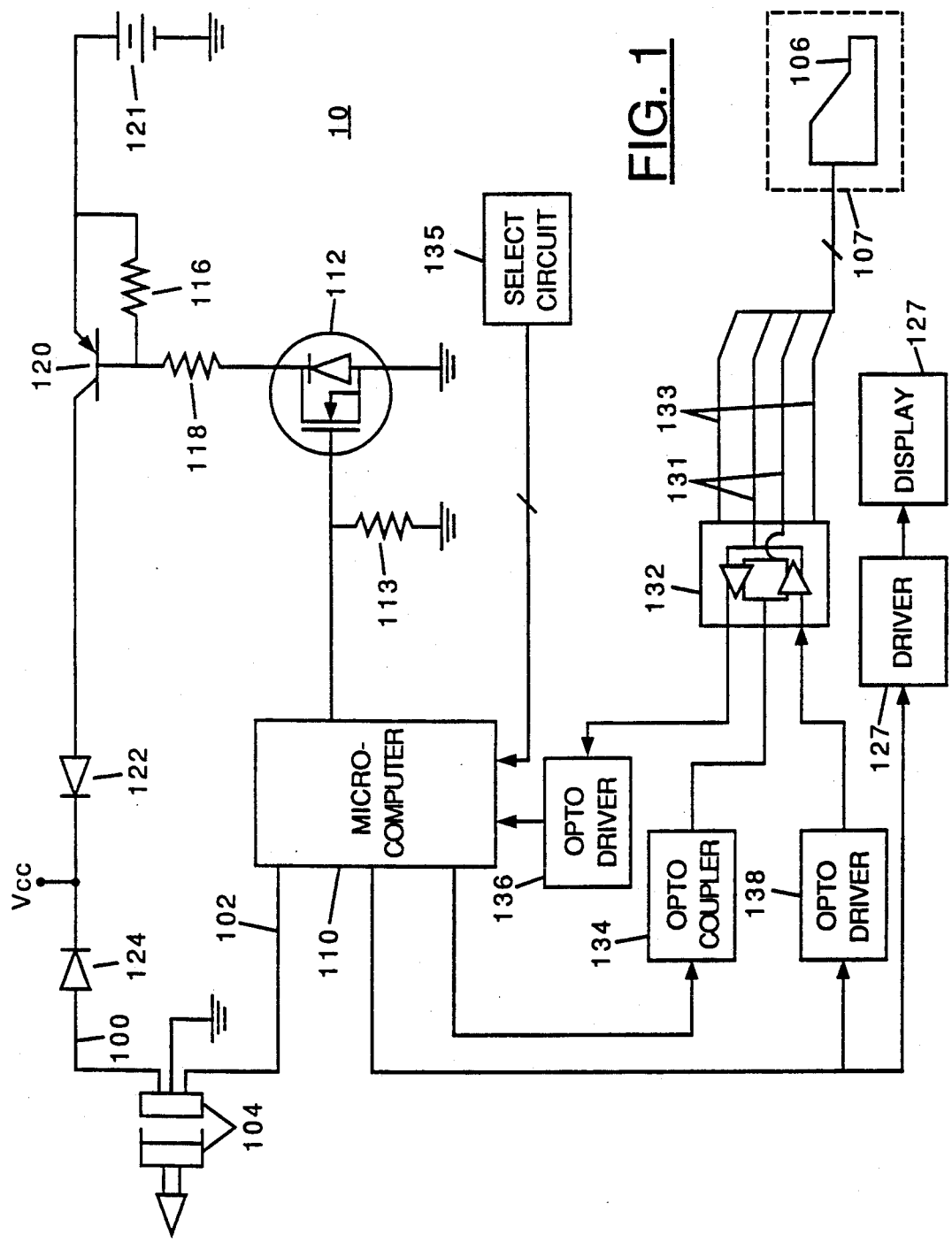

The present invention is particularly suited for enabling a fault-powered circuit breaker trip unit to communicate with an external station over a communication network after the trip unit's power has been removed. The present invention is not, however, limited to communicating to an external station. As will become apparent from the following discussion, the circuit arrangement which is illustrated in the FIGURE may include a display and/or nonvolatile memory for remote or local access after the removal of power.

Turning now to the FIGURE, the present invention is exemplified in schematic diagram form as a circuit arrangement 10 for receiving and processing data from a fault-powered circuit breaker trip unit (not shown) and sending information representative of the data to an external computer station 106, which forms part of a communication network 107. The data sent by the trip unit, over line 102, includes serial data related to the cause of the trip and may include regularly processed line condition information, such as the current and voltage magnitudes of the power lines. The computer station 106 and its communication with the circuit arrangement 10 may be implemented as described in WAVEFORM CAPTURING ARRANGEMENT IN A DISTRIBUTED POWER NETWORK, filed on Apr. 2, 1990, U.S. patent application Ser. No. 07/503,267, or using conventional IEEE RS-422 communications practices.

The circuit arrangement 10 is powered by the trip unit so long as the trip unit is powered. The power is provided, over line 100, along with ground and the serial data, using a male-female plug-in connector set 104 to interconnect the circuit arrangement with the trip unit. The connector set 104 is used to facilitate field installation of the circuit arrangement with previously installed trip units.

Overall control of the circuit arrangement 10 is provided by a microcomputer 110, which receives and responds to the serial data sent from the trip unit using a serial input connection 102. The microcomputer 110 stores and monitors the trip unit data to determine when the trip unit has sent information indicating that it is about to trip the circuit breaker. This step is important, because the power to both the trip unit and circuit arrangement is removed after the circuit breaker is tripped. Preferably, the microcomputer 110 is forewarned of an imminent trip condition using a code sent over the serial data line from the trip unit so that it may react quickly.

Once the microcomputer 110 detects that a trip condition is about to occur, it enables a transistor 112, which allows current from a battery 121 to flow through a transistor 120 so that power is continuously provided to the circuit arrangement 10 through at least one of two diodes 122 and 124. A resistor 113 is used to bias the transistor 112, and resistors 116 and 118 provide a voltage difference between the base and the emitter of the transistor 120 necessary to turn on the transistor 120. Consequently, before it loses power from the trip unit, the microcomputer 110 commands the transistor 112 to switch on the battery 121 so that power is provided to the circuit arrangement 10 through transistor 120.

With full power provided to the microcomputer by the backup power source, the microcomputer is capable of performing all the same functions as when powered by the trip unit. For example, the microcomputer 110 can format and store data in its internal memory and/or send the data to a separate, external memory for subsequent access by the computer station 106. The microcomputer 110 can also display the data using a driver and display circuit 127 as the application may require.

The microcomputer 110 preferably sends the representative data to the computer station 106 using an IEEE RS-422 standardized communication procedure with differential asynchronous serial data lines 131 and network power and ground lines 133. Such an arrangement allows a multitude of similarly designed circuit arrangements 10 to communicate with the computer station 106 in multidrop fashion, so as to provide centralized control to a computer station operator monitoring the circuit arrangements 10. As illustrated in the FIGURE, this may be accomplished using an optically isolated differential driver circuit, which includes an optical coupler 134, a pair of optical drivers 136 and 138 and a differential transceiver 132, which performs the function of a differential driver in two directions. The optical coupler 134 allows the microcomputer 110 to control the receive/transmit operation of the differential transceiver 132, using one of its peripheral control ports, without exposing the microcomputer 110 to voltage transients on the computer station side of the differential transceiver 132. Similarly, the optical drivers 136 and 138 protect the microcomputer 110 from damage during the respective data receive and data transmit modes.

Communication between the control station 106 and the circuit arrangement 10 is preferably regulated by an address select circuit 135 so that each of the multitude of circuit arrangements may be selected to communicate with the computer station 106 without data collisions. The address select circuit 135 can be contained within the microcomputer, but is preferably a separate circuit. The address select circuit 135 may be implemented in any of a number of ways. For example, DIP switches, BCD switches or jumper wires may be used to assign the circuit arrangement 10 to a distinct differential bus address. The microcomputer 110 associated with each circuit arrangement 10 is normally monitoring the differential bus to determine when it should transmit data. Once a communication request is received, the microcomputer 110 enables the transmit mode of the driver circuit and transmits the requested data. If the data is transmitted after the battery 121 has been enabled, the microcomputer 110 preferably disables the battery 121 after the data is transmitted to preserve battery power and to ensure that enough power will be available for future communications.

The following component values and types may be used to implement the structure depicted in the FIGURE: resistors 113, 116, and 118 having the values 470 k, 100 k and 27 k ohms, respectively; and diodes 122 and 124 being IN5711 and MMBD914L types, respectively. Additionally, the transistors 112 and 120 may be implemented using MMBF170L and 2N5087 type transistors, respectively. The microcomputer may be a MC68HC705C8, or any suitable microcomputer The battery 121 can assume any form so long as it provides the appropriate power to the microcomputer for an adequate time period to allow it to store and/or transmit the data. The optical drivers 136 and 138 and the optical coupler 134 may be implemented using MOC215 type ICs, and the differential transceiver using a DS3695 type IC.

While the present invention has been described with reference to the embodiment of the FIGURE, those skilled in the art will recognize that many changes may be made thereto without departing from the spirit and scope of the present invention. For example, it would not be a departure from the present invention to replace the microcomputer with logic circuits which would perform the same functions. These and like changes do not detract from the intended scope of the present invention, which is set forth in the following claims.

We claim:

1. A circuit arrangement for processing data sent from a fault-powered circuit breaker trip unit comprising:
   means for drawing power from the trip unit;
   a backup power source;
   a fault-powered control circuit that is responsive to the trip unit and that detects a trip unit alarm condition, receives data from the circuit breaker trip unit and processes the data for subsequent use, said control circuit being powered by said means for drawing power from the trip unit; and
   a switch circuit that, responsive to the control circuit detecting the trip unit alarm condition, engages the backup power source such that power continues to be provided to the control circuit after the power drawn from the trip unit expires so that the control circuit can continue to function after the power from the trip unit expires.

2. A circuit arrangement, according to claim 1, wherein the control circuit processes the received data using a microcomputer which is programmed to receive and store the trip unit data and to transmit information representative of the data to an external device.

3. A circuit arrangement, according to claim 1, further including a drive circuit, responsive to the control circuit, which provides an interface between the control circuit and a communication network, which allows the control circuit to communicate with the external station.

4. A circuit arrangement, according to claim 3, wherein the drive circuit includes isolation circuitry which is responsive to the control circuit such that signals between the control circuit and communication network are optically isolated from each other.

5. A circuit arrangement, according to claim 4, wherein the drive circuit includes at least one differential transceiver.

6. A circuit arrangement, according to claim 1, wherein the backup power source includes at least one battery cell.

7. A circuit arrangement, according to claim 1, wherein the backup power source powers the entire control circuit.

8. A circuit arrangement, according to claim 1, further including at least one plug-in connector interconnecting the circuit arrangement and the trip unit to facilitate field installation of the circuit arrangement.

9. A circuit arrangement for processing data from a fault-powered circuit breaker trip unit comprising:
   means for drawing power from the trip unit;
   a backup power source;
   a fault-powered control circuit that is responsive to the trip unit and that detects a trip unit alarm condition, receives data from the circuit breaker trip unit, stores information representative of the trip unit data, and transmits information representative of the data to an external station, said control circuit being powered by said means for drawing power from the trip unit;
   a switch circuit that, responsive to the control circuit detecting the trip unit alarm condition, engages the backup power source such that power continues to be provided to the control circuit after the power drawn from the trip unit expires; and
   an interface circuit, responsive to information representative of the data received from the trip unit, which isolates and amplifies data signals sent between the control circuit and the external station.

10. A circuit arrangement, according to claim 9, wherein the interface circuit includes at least one differential driver and at least one optical isolation circuit.

11. A circuit arrangement 10, wherein the differential drive includes means for receiving and transmitting the data signals.

12. A circuit arrangement, according to claim 9, wherein the switch circuit disables the backup power source to conserve battery power after the control circuit transmits the representative information.

13. A circuit arrangement, according to claim 9, further including at least one plug-in connector interconnecting the circuit arrangement and the trip unit to facilitate field installation of the circuit arrangement.

14. A circuit arrangement for processing data sent from a fault-powered circuit breaker trip unit, comprising:
   means, coupled to the trip unit, for drawing power therefrom and providing said power to at least part of the circuit arrangement;
   a fault-powered control circuit, including a microcomputer which is arranged such that it is capable of detecting a trip unit alarm condition, receives data from the circuit breaker trip unit, stores information representative of the trip unit data, and transmits information representative of the data to a communication network, said control circuit being powered by said means for drawing power from the trip unit;
   at least one plug-in connection interconnecting the circuit arrangement and the trip unit to facilitate field installation of the circuit arrangement;
   a secondary power source, responsive to a trip condition being detected, powering at least the control circuit;
   a switch circuit that, responsive to the control circuit detecting the trip unit alarm condition, enables the secondary power source so that power continues to be provided to the control circuit after the power drawn from the trip unit expires;
   an isolation circuit, responsive to the control circuit, which provides optical isolation between the control circuit and the communication network; and
   a drive circuit, responsive to the control circuit, which provides additional power to the data that is sent over the communication network.

15. A circuit arrangement, according to claim 14, wherein the switch circuit disables the backup power source to conserve battery power after the control circuit transmits the representative information.

16. A method for providing trip unit information to a station remotely located from the trip unit, comprising the steps of:
   drawing power from the trip unit to power a microcomputer so that the microcomputer is fault-powered;
   providing a backup power source;
   in response to the trip unit providing a trip unit alarm condition, using said microcomputer to receive data from the circuit breaker trip unit, to store information representative of the trip unit data, and to transmit information representative of the data to an external station;
   in response to the trip unit providing a trip unit alarm condition, enabling the backup power source to provide power to the microcomputer after the power drawn from the trip unit expires; and
   in response to the microcomputer transmitting the representative information, conserving power by disabling the backup power source so that power is no longer provided to the microcomputer.

17. A method, according to claim 16, further including the step of providing at least one differential driver as an interface between the microcomputer and the external station.

18. A method, according to claim 16, further including the step of optically isolating the microcomputer from the external station.

19. A method, according to claim 16, further including the step of providing a circuit arrangement which performs the steps of claim 16 and providing at least one plug-in connector interconnecting the circuit arrangement and the trip unit to facilitate field installation of the circuit arrangement.

20. A method, according to claim 16, further including the step of providing a battery cell as at least part of the backup power source.

* * * * *